(12) United States Patent
Hakola et al.

(10) Patent No.: US 10,484,983 B2
(45) Date of Patent: Nov. 19, 2019

(54) ROBUST CONTROL CHANNEL TRANSMISSION SCHEME

(71) Applicant: Nokia Technologies Oy, Espoo (FI)

(72) Inventors: Sami-Jukka Hakola, Kempele (FI); Esa T. Tiirola, Kempele (FI); Mihai Enescu, Espoo (FI); Jorma Kaikkonen, Oulu (FI); Juha P. Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 46 days.

(21) Appl. No.: 15/873,066

(22) Filed: Jan. 17, 2018

(65) Prior Publication Data

US 2018/0227887 A1 Aug. 9, 2018

Related U.S. Application Data

(60) Provisional application No. 62/455,094, filed on Feb. 6, 2017.

(51) Int. Cl.
*H04W 4/00* (2018.01)
*H04W 72/04* (2009.01)
(Continued)

(52) U.S. Cl.
CPC ......... *H04W 72/042* (2013.01); *H04B 7/022* (2013.01); *H04B 7/0617* (2013.01);
(Continued)

(58) Field of Classification Search
CPC .... H04B 7/022; H04B 7/0408; H04B 7/0617; H04B 7/0695; H04W 72/042; H04W 72/046; H04W 74/0833
See application file for complete search history.

(56) References Cited

U.S. PATENT DOCUMENTS 9,319,128 B2 *  4/2016  Yamamoto .......... H04B 7/18508
2013/0051364 A1 *  2/2013  Seol ....................... H04W 16/28
370/331

(Continued)

FOREIGN PATENT DOCUMENTS

WO      2017045694 A1    3/2017

OTHER PUBLICATIONS

R1-1612863 by Nokia, Alcatel-Lucent and Shanghai Bell entitled "Beam management DCI monitoring", (3GPP TSG-RAN W1#87, Reno, US; Nov. 14-18, 2016), 3 pgs.
(Continued)

*Primary Examiner* — Minh Trang T Nguyen
(74) *Attorney, Agent, or Firm* — Harrington & Smith (57) ABSTRACT

Signaling is received (or transmitted) to configure a UE with multiple transmit beams, each for receiving beam-specific DCI. A beam-specific current DCI is received at the UE (or transmitted from a network) on the transmit beam(s), including information about beam-specific previous DCIs transmitted to the UE on any of the multiple transmit beams within a predefined time window preceding a time unit in which the current DCI was received. Information about the beam-specific previous DCIs is used to determine that at least one of the multiple transmit beams has been blocked. Each of the multiple transmit beams that have been determined to be blocked is reported to (and received by) the network. In response to receiving from the UE a report indicating at least one multiple transmit beams has been blocked, the network reconfigures the UE with a different set of multiple transmit beams each for beam-specific DCI.

20 Claims, 7 Drawing Sheets

(51) Int. Cl.
*H04B 7/022* (2017.01)
*H04B 7/06* (2006.01)
*H04W 74/08* (2009.01)
*H04B 7/0408* (2017.01)

(52) U.S. Cl.
CPC ......... *H04B 7/0695* (2013.01); *H04B 7/0408* (2013.01); *H04W 72/046* (2013.01); *H04W 74/0833* (2013.01)

(56) References Cited

U.S. PATENT DOCUMENTS

| | | | |
|---|---|---|---|
| 2015/0282001 A1* | 10/2015 | Kwak | H04B 7/0617 370/229 |
| 2016/0150435 A1 | 5/2016 | Baek et al. | |
| 2017/0086080 A1* | 3/2017 | Sun | H04L 67/104 |
| 2017/0111810 A1* | 4/2017 | Awada | H04B 17/309 |
| 2018/0102826 A1* | 4/2018 | Raghavan | H04B 7/0617 |
| 2019/0124610 A1* | 4/2019 | Stirling-Gallacher | H04W 56/0005 |

OTHER PUBLICATIONS

R1-1701089 by Nokia, Alcatel-Lucent and Shanghai Bell entitled "Beam management DCI monitoring", (3GPP TSG RAN WG1 NR Ad-Hoc Meeting; Spokane, US; Jan. 16-20, 2017), 4 pgs.

R1-1701093 by Nokia, Alcatel-Lucent and Shanghai Bell entitled "Multi-beam control channel transmission", (3GPP TSG RAM WG1 NR Ad-Hoc Meeting; Spokane, US;Jan. 16-20, 2017), 5 pgs.

R1-1701011 by Nokia, Alcatel-Lucent and Shanghai Bell entittled "On the PDCCH search space structure for NR", (3GPP TSG-RAN WG#NR; Spokane, US; Jan. 16-20, 2017), 3 pgs.

"3rd Generation Partnership Project; Technical Specification Group Radio Access Network; Evolved Universal Terrestrial Radio Access (E-UTRA); Physical layer procedures (Release 14)", 3GPP TS 36.213 V14.1.0, Section 7.3, (Dec. 2016), 32 pgs.

"3rd Generation Partnership Project; Technical Specification Group Radio Access Network; Study on New Radio Access Technology (Release 14)", 3GPP TR 38.912 V0.0.2, (Sep. 2016), 11 pgs.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0 (Dec. 2016), 654 pgs.

* cited by examiner

ROBUST CONTROL CHANNEL TRANSMISSION SCHEME

CROSS-REFERENCE TO RELATED APPLICATIONS

The present application claims the benefit under 35 U.S.C. § 119(e) of U.S. Provisional Patent Application No. 62/455,094, filed on Feb. 6, 2017, the disclosure of which is hereby incorporated by reference in its entirety.

TECHNOLOGICAL FIELD

The described invention relates to wireless communications, and more particularly to control channel signaling that can be used to identify a blocked beam in a radio environment in which a user equipment (UE) has connections with multiple transmit-receive points (TRPs) over multiple beams.

BACKGROUND

Wireless radio access technologies continue to be improved to handle increased data volumes and larger numbers of subscribers. The 3GPP organization is developing a new radio system (commonly referred to as NR or $5^{th}$ Generation/5G) to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming and a higher antenna gain. Analog beamforming and/or hybrid beamforming architectures containing both analog and digital beamforming will be utilized at least in certain m-MIMO scenarios operating in the mmWave band.

Figure 1:
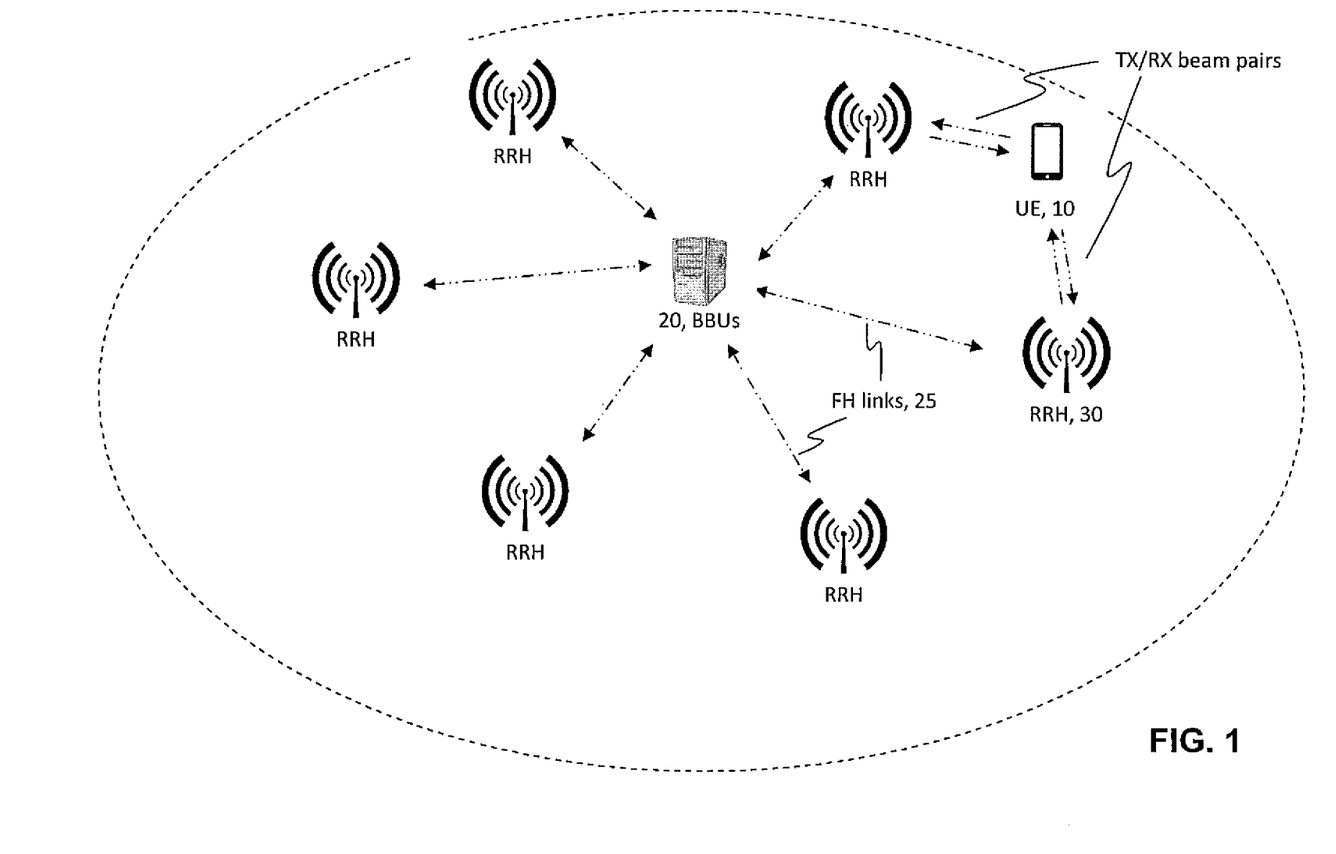
FIG. 1 is a plan view illustration of a NR/5G radio environment in which embodiments of these teachings may be practiced to advantage.

FIG. 1 is a schematic overview of an example 50 radio environment in which these teachings may be deployed. Rather than a conventional unitary cellular base station/eNB the 5G system is to have the conventional base station's functionality distributed among a baseband unit (BBU) 20 (which may be implemented as a single BBU or multiple interconnected BBUs) and one or typically multiple remote radio heads (RRHs) 30 each located up to a few kilometers from the BBU 20. Each RRH 30 is operationally connected to its BBU 20 via a wired or wireless bidirectional transmission link 25 referred to as a front haul (FH) link. Currently the BBU/RRH combination in 5G systems is referred to as a gNB. The UE 10 is in direct communication with one or more of the RRHs 30, which in the 5G system each RRH 30 would be operating as a transmission/reception point (TRP) of the gNB. The UE 10 may have active connections to more than one RRH 30, shown in FIG. 1 as two TX/RX beam pairs with two different TRPs/RRHs. There is a somewhat similar distribution of access node functionality in cloud-based radio access networks (C-RAN) that are currently being deployed at least for some LTE-based networks, though those systems typically use a different terminology than BBU and RRH.

Beam blockage becomes an acute concern at mmWave frequencies, and downlink control channels in particular need robustness against such blockages. In general narrow beams between transmitter and receiver are more sensitive to blockage than wide or omnidirectional beams. Each TRP within a cell may perform beam sweeping to enable UEs to detect and measure potential transmit beams, for example for downlink control (NR-PDCCH) and shared data channels (NR-PDSCH). Different UEs may of course have different beamforming capabilities, for example a given UE may be able to receive using one or using multiple RX beams at a time. Providing connection to UE from multiple TRPs within a cell provides diversity against sudden beam blockages.

Consider the PDCCH which can schedule multiple UEs for uplink or downlink resources for communicating data. A given UE has a prescribed window in which to listen for a PDCCH addressing it, and if this UE does not see its own identifier in a given PDCCH that means this PDCCH does not schedule resources for this UE. This operation may be referred as PDCCH blind detection. In this case the UE would not signal the network to confirm it read the PDCCH that did not schedule it. But if instead a given PDCCH did schedule the UE and the UE did not properly receive it, for example due to blockage of the beam that was to carry it, the UE would also not signal the network for it does not know it missed a PDCCH. In the latter case the network would eventually recognize this because the UE would either not send data on its scheduled uplink resource, or would not acknowledge data sent to it on the scheduled downlink resource. But this is too long of a delay, particularly in a NR/5G type radio environment where the viable beams for a UE may change rapidly. Embodiments of these teachings utilize that PDCCH, or more generally control channel signaling, so that the UE and the network can recognize beam disruptions sooner.

Some relevant teachings may be seen at the following documents.

- R1-1612863 by Nokia, Alcatel-Lucent and Shanghai Bell entitled Beam management—DCI monitoring [3GPP TSG-RAN W1#87; Reno, US; 14-18 Nov. 2016].
- R1-1701089 by Nokia, Alcatel-Lucent and Shanghai Bell entitled Beam management—DCI monitoring [3GPP TSG RAN WG1 NR Ad-Hoc Meeting; Spokane, US; 16-20 Jan. 2017].
- R1-1701093 by Nokia, Alcatel-Lucent and Shanghai Bell entitled Multi-beam control channel transmission [3GPP TSG RAN WG1 NR Ad-Hoc Meeting; Spokane, US; 16-20 Jan. 2017].
- R1-1701011 by Nokia, Alcatel-Lucent and Shanghai Bell entitled On the PDCCH search space structure for NR [3GPP TSG-RAN WG#NR; Spokane, US; 16-20 Jan. 2017].
- US patent application publication 2016/0150435 by Beak t al. entitled Communication Method and Apparatus Using Beamforming [published 26 May 2016].
- International patent application serial number PCT/EP2015/070926 [by Nokia Technologies Oy, and published as WO/2017/045694, published on Mar. 23, 2017].

BRIEF SUMMARY

This section is intended to include examples and is not intended to be limiting.

An exemplary embodiment is an apparatus. The apparatus comprises at least one processor and at least one memory tangibly storing a computer program. The at least one processor is configured with the at least one memory and the computer program to cause the apparatus to: receive signaling to configure a user equipment (UE) with multiple transmit beams each for receiving beam-specific downlink control information (DCI); receive a beam-specific current DCI at the UE on at least one of the transmit beams, said received current DCI including information about beam-specific previous DCIs transmitted to the UE on any of the multiple transmit beams within a predefined time window preceding a time unit in which the current DCI was received; use the information about the beam-specific previous DCIs to determine that at least one of the multiple transmit beams has been blocked; and report each of the multiple transmit beams that have been determined to be blocked.

Another exemplary embodiment is a method. The method comprises the following: receiving signaling to configure a user equipment (UE) with multiple transmit beams each for receiving beam-specific downlink control information (DCI); receiving a beam-specific current DCI at the UE on at least one of the transmit beams, said received current DCI including information about beam-specific previous DCIs transmitted to the UE on any of the multiple transmit beams within a predefined time window preceding a time unit in which the current DCI was received; using the information about the beam-specific previous DCIs to determine that at least one of the multiple transmit beams has been blocked; and reporting each of the multiple transmit beams that have been determined to be blocked.

A further exemplary embodiment is a computer readable memory tangibly storing a computer program that when executed causes a host radio network access node to perform a method comprising the following: receiving signaling to configure a user equipment (UE) with multiple transmit beams each for receiving beam-specific downlink control information (DCI); receiving a beam-specific current DCI at the UE on at least one of the transmit beams, said received current DCI including information about beam-specific previous DCIs transmitted to the UE on any of the multiple transmit beams within a predefined time window preceding a time unit in which the current DCI was received; using the information about the beam-specific previous DCIs to determine that at least one of the multiple transmit beams has been blocked; and reporting each of the multiple transmit beams that have been determined to be blocked.

A further example is an apparatus. The apparatus comprises at least one processor and at least one memory tangibly storing a computer program; wherein the at least one processor is configured with the at least one memory and the computer program to cause the apparatus to: configure a user equipment (UE) with multiple transmit beams each for receiving beam-specific downlink control information (DCI); transmit to the UE a beam-specific current DCI on at least one of the transmit beams, said transmitted current DCI including information about beam-specific previous DCIs transmitted to the UE on any of the multiple transmit beams within a predefined time window preceding a time unit in which the current DCI was received; and in response to receiving from the UE a report indicating at least one multiple transmit beams has been determined to be blocked, reconfigure the UE with a different set of multiple transmit beams each for beam-specific DCI.

An additional exemplary embodiment is a method. The method comprises the following: configuring a user equipment (UE) with multiple transmit beams each for receiving beam-specific downlink control information (DCI), transmitting to the UE a beam-specific current DCI on at least one of the transmit beams, said transmitted current DCI including information about all beam-specific previous DCIs transmitted to the UE on any of the multiple transmit beams within a predefined time window preceding a time unit in which the current DCI was received, after the transmitting and in response to receiving from the UE a report indicating at least one multiple transmit beams has been determined to be blocked, re-configuring the UE with a different set of multiple transmit beams each for beam-specific DCI.

A computer readable memory is another example, the computer readable memory tangibly storing a computer program that when executed causes a host radio network access node to perform a method comprising: configuring a user equipment (UE) with multiple transmit beams each for receiving beam-specific downlink control information (DCI), transmitting to the UE a beam-specific current DCI on at least one of the transmit beams, said transmitted current DCI including information about all beam-specific previous DCIs transmitted to the UE on any of the multiple transmit beams within a predefined time window preceding a time unit in which the current DCI was received, after the transmitting and in response to receiving from the UE a report indicating at least one multiple transmit beams has been determined to be blocked, re-configuring the UE with a different set of multiple transmit beams each for beam-specific DCI.

DETAILED DESCRIPTION

The embodiments below are in the context of a NR/5G radio system but this is only an example radio environment and not a limit to the broader teachings herein. Since these teachings are directed primarily to the exchange between the radio network and the UE, the network side of this exchange will be described with reference to a TRP, which per FIG. 1 may be RRHs but not all TRPs are RRHs.

Given the sensitivity to beam blockage at mmWave frequencies in general, in the 3GPP group's development of NR/5G it is already being considered to make the NR-PDCCH more robust by enabling it to be transmitted to the UE from multiple TRPs, meaning multiple beams. Further refining this in view of the fact that not all UEs may be capable of 'listening' simultaneously in multiple directions, a time domain pattern for the PDCCH beams is being considered so that the UE is able to know which beam would be the transmitting beam for PDCCH at a certain slot. On the other band, this beam blockage issue is present also in those scenarios where UE is capable of 'listening' simultaneously in multiple directions.

One way to implement such a time domain PDCCH beam pattern is to consider a primary beam used for the intended (primary) PDCCH transmission and also a secondary beam to serve as a backup beam or beams. The gNB's configuring of the secondary beam(s) can mainly target recovering the PDCCH connection if the primary beam has degraded, for example due to blockage. The UE may be provided corresponding uplink PUCCH or PUSCH resources, which may be carried in secondary uplink RX beams which the UE can align to its DL TX beam. These uplink control information resources may be semi-statically allocated within the same primary/secondary beam configuration. Upon reception of the UE's periodic or aperiodic beam report the gNB may update the current serving beam set to the UE for PDCCH reception.

Figure 2A:
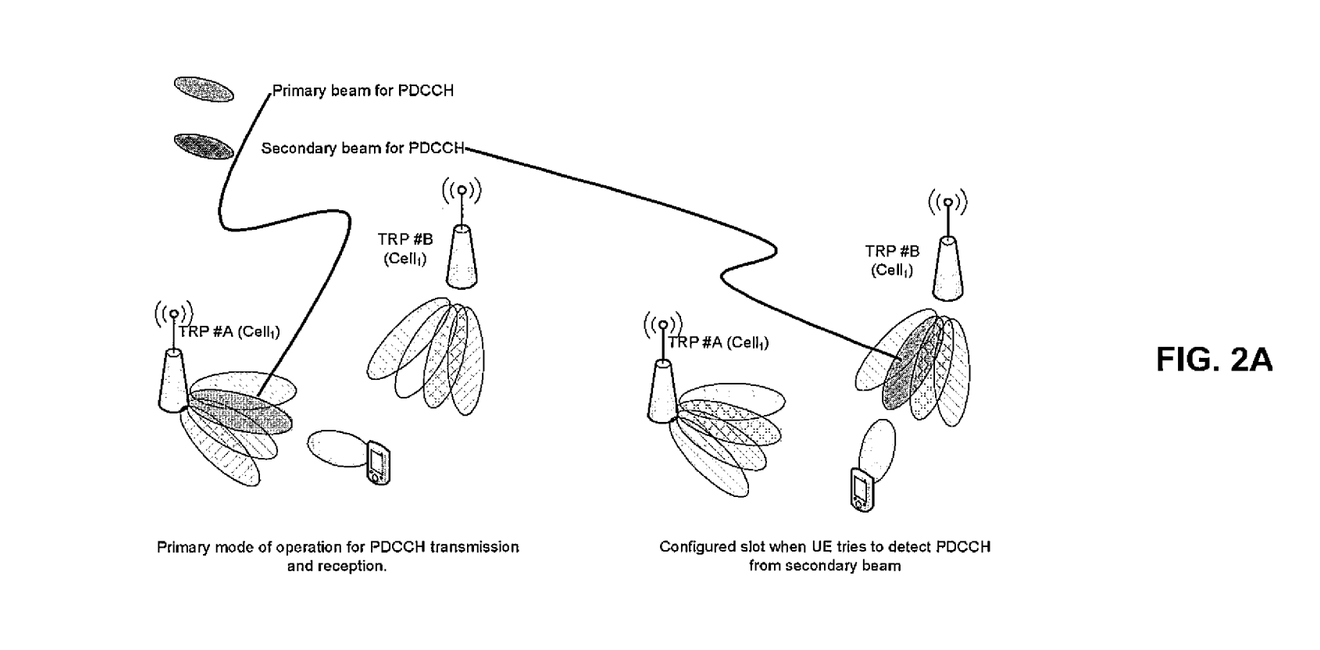
FIG. 2A is a perspective conceptual view of primary and secondary PDCCH beams for PDCCH transmission from two different TRPs.
Figure 2B:
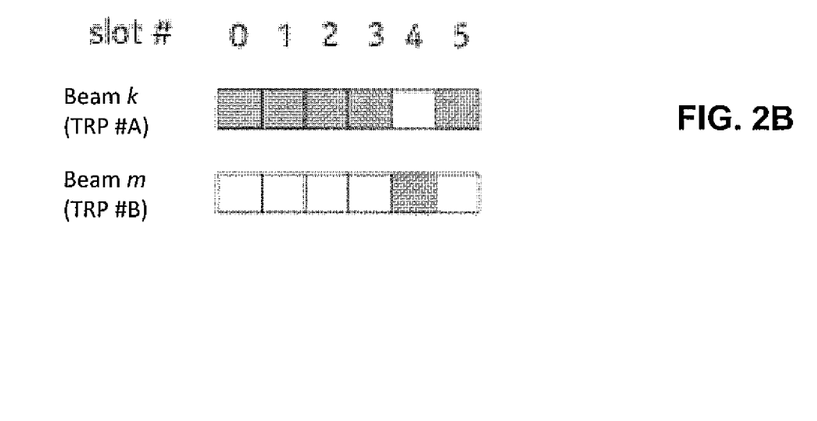
FIG. 2B is a table showing an example NR-PDCCH monitoring pattern for two configured reference transmit beams.

FIG. 2A illustrates a configuration where a UE with capability to form one RX beam at a time is configured with two reference transmit beams for NR-PDCCH reception. Specifically, the UE's primary beam for PDCCH is shown at the left with TRP #A during one time interval and the UE's secondary beam for PDCCH is shown at the right with TRP #B during another time interval. The configuration to the UE includes a time domain pattern to indicate the UE which reference transmit beam to monitor on a certain NR-PDCCH time resource. In this regard such a time resource may for example have (OFDM) symbol level or mini-slot level or slot level granularity, and FIG. 2B illustrates an example of such a time pattern with slot-level granularity. In an embodiment the slot may correspond to a regular scheduling unit in time, and in various example embodiments one slot may run 7, 14 or 28 symbols. The length of the slot may define for example the granularity for link direction switching. A mini-slot would provide a smaller scheduling unit in time as compared to a slot, and for example a mini-slot may consist of one or a few symbols in time. For this particular UE beam index k is the primary beam with TRP #A and the UE is to monitor that primary beam during slots 0-3 and 5; and beam index m is the secondary beam with TRP #B and the UE is to monitor that secondary beam during slot 4.

To be suitable for adoption into the NR/5G radio system any solution to quickly identify when a beam is blocked needs to comply with current NR/5G agreements. In relevant part those include that the NR-PDCCH transmission is to support robustness against beam pair link blocking in the following manner. In one example such a beam pair corresponds to two beams with different polarization. Firstly, the UE can be configured to monitor NR-PDCCH on M beam pair links simultaneously, where M is at least one and its value may depend on the UE capability. It is not yet decided whether the UE may choose at least one beam out of all the M beam pairs for NR-PDCCH reception. Secondly, the UE can be configured to monitor NR-PDCCH on different beam pair link(s) in different NR-PDCCH OFDM symbols. In this regard it is still open whether there can be different NR-PDCCH duty cycles on the different beam pair link(s), and whether the configuration will be slot-level or mini-slot level or symbol-level granularity. Thirdly, parameters related to the UE RX beam setting for monitoring the NR-PDCCH on multiple beam pair links are to be configured by higher layer signaling or by a MAC CE, else it may be considered in the design of the search space for the NR-PDCCH. While the example at FIG. 2A has one primary and one secondary beam for PDCCH, UEs with more advanced capability may be configured with multiple primary and/or secondary beams for PDCCH.

Also in NR/5G systems, particularly in multi-beam configurations there are no always-on reference signals (RSs) that the UE can use for measuring and validating that the current radio link is suitable, for example suitable for PDCCH reception. NR/5G systems are expected to include periodic synchronization signals (SSs) in block transmissions and these may include some beam specific reference signal aimed at providing such SSs, the PBCH and beam-specific RSs throughout the cell in beam sweeping manner. Because of this beam sweeping operation a full sweep period may need to be relaxed due to system overhead reasons. The end result is then that the UE may not be able to declare with certainty that a beam blockage has occurred for the primary link because the UE may simply assume it has not detected NR-PDCCH because the gNB has not transmitted NR-PDCCH via the primary beam, as mentioned above.

NR/5G is being designed as an efficient beam-based system meaning one of its functionalities is a fast link/beam recovery procedure or beam switching procedure. But when there is beam blockage these procedures can only be invoked once that blockage is recognized, and the above example shows this is not always straightforward. The solution presented herein is for the UE to initiate the relevant beam recovery/beam switch procedures as the inventors consider it would add latency if the gNB were tasked with identifying the beam failure situation (at least from HARQ-ACK) because typically the gNB cannot differentiate a UE's missed PDCCH (DTX) from a UE's negative acknowledgement (NACK). Defining HARQ-ACK feedback according to 3-stage (DTX/NACK/ACK) instead of 2-stage (NACK/ACK) would increase the HARQ-ACK feedback load considerably, and it would have negative impact to UL coverage and control channel overhead.

In general the UE blindly detects the PDCCH during its monitoring window. Co-owned international patent application PCT/EP2015/070926 concerns blind detection in a beam-based system and describes a downlink control signal that indicates which beams the gNB transmitted at a certain time instant such as slot or subframe. In the LTE (4° generation) radio access technology there is a Downlink Assignment Index (DAI) described at section 7.3 of 3GPP TS 36.213 v14.1.0 (2016-12) that operates as a 2-bit count of the number of dynamically scheduled PDSCHs (that is, PDSCH with corresponding PDCCH) to better facilitate PDCCH error handling with time-domain HARQ-ACK bundling, and for the uplink assignments as a 2-bit indication of the total number of semi-persistent or dynamically scheduled PDSCHs (that is, PDSCHs with and without corresponding PDCCH) to facilitate dynamic codebook size adaptation when HARQ-ACK is multiplexed with uplink shared channel data on the PUSCH. The NR/5G system is anticipated to includes something similar to this for dynamic HARQ-ACK codebook adaptation.

Further in the LTE radio access technology, radio link failure is generally determined in the higher layers (see 3GPP TS 36.331), for example when radio link control (RLC) indicates the maximum number of re-transmissions has been reached or expiry of a timer that is initiated when some physical layer problem is detected such as a number of consecutive out-of-synch indications from lower layers. But beam recovery in a NR/5G system is not quite like radio link failure in LTE/4G systems because there is no beam discovery in the LTE/4G radio link failure protocol; beam discovery necessary to find out what beam or beams is to be recovered or switched. Further, beam recovery, by its nature of being a routine event in NR/5G, should have a much smaller latency than radio link failure processes which are sporadic in LTE/5G (for example, due to a failed handover).

The example embodiments below provide a new signalling procedure that enables a given UE to determine, categorically, whether there is a blockage between certain transmit beam(s) and the UE, and further provides a capability for the UE to trigger a beam recovery procedure based on that determined blockage between certain transmit beam(s) and the UE.

Specifically, in an example embodiment there is signalling information in the NR-PDCCH that tells whether or not a configured gNB transmit beam or beams has/have transmitted NR-PDCCH to this UE in an earlier time window (within some earlier N time units where N is a positive integer). The time unit refers to PDCCH time domain search space granularity which may for example be a slot, a mini-slot, a number of slots, a number of mini-slots, or even a symbol or number of symbols. The 2-bit counter DAI type indicator that is used for dynamic HARQ-ACK codebook adaptation could be adapted for such a use, for example by expanding it to 3-bits. 2-bit counter DAI could also be a sufficient solution at least in certain scenarios.

In a particular embodiment this indication signalling is common across all of the configured transmit beams for PDCCH transmission, so as to enable the UE to determine the potential blockage of any one or more of those pre-configured transmit beams. For example, in the case of multiple TRPs in a cell it is expected that the UE will be configured with transmit beams from multiple TRPs for increased robustness, as is shown at FIG. 2A. While the FIG. 2A example shows one transmit beam per TRP configured for the UE at any given time instant, it is expected that deployed 5G systems can typically exhibit multiple configured transmit beams used in parallel within each TRP (or at least some of the TRPs in a given UE's TRP set).

Having this signalling information upon reception the NR-PDCCH that carries it, the UE may then determine based on certain predetermined rules that there is a blockage between a certain transmit beam and the UE and this determination may trigger a beam recovery procedure. In one example such a predetermined rule may require that if some integer number N of NR-PDCCHs have been missed from a certain transmit beam the UE is to trigger a beam recovery procedure. Alternatively the rule may be permissive rather than mandatory so that if the condition is met the UE may trigger the beam recovery procedure, for example if there are multiple primary PDCCH beams configured and only one is blocked the UE may choose not to trigger the beam recovery procedure. In this regard, the term beam recovery procedure also includes beam switching procedure, which is a viable option as long as the UE has at least one non-blocked TX-RX beam pair with its serving gNB. Beam pair is as shown in FIG. 1, namely a gNB's TX beam and a UE's RX beam that are aligned with one another.

Figure 3:
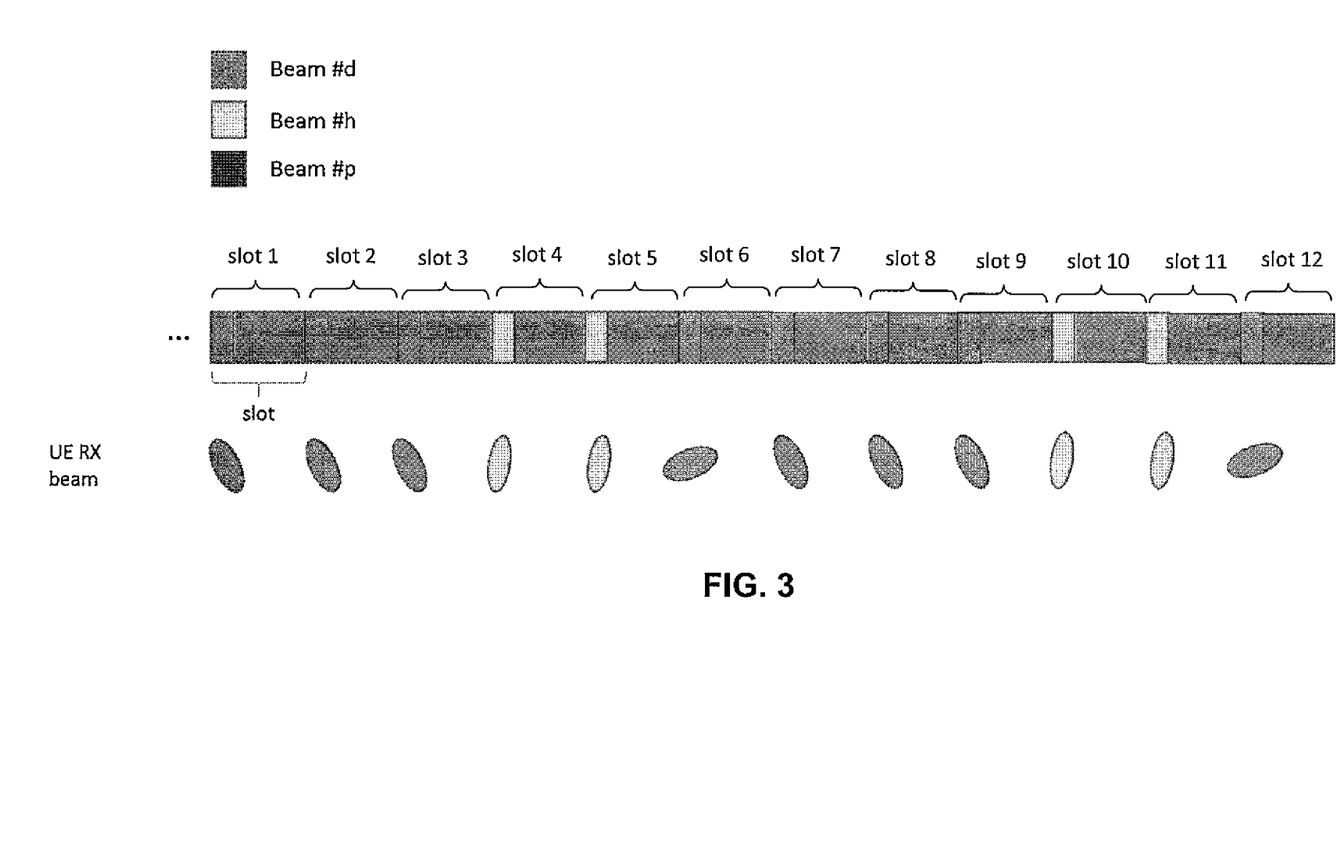
FIG. 3 is a time diagram of radio slots illustrating another NR-PDCCH monitoring pattern for three configured reference transmit beams for NR-PDCCH transmission when the UE can form only one receive beam at a time.
Figure 4:
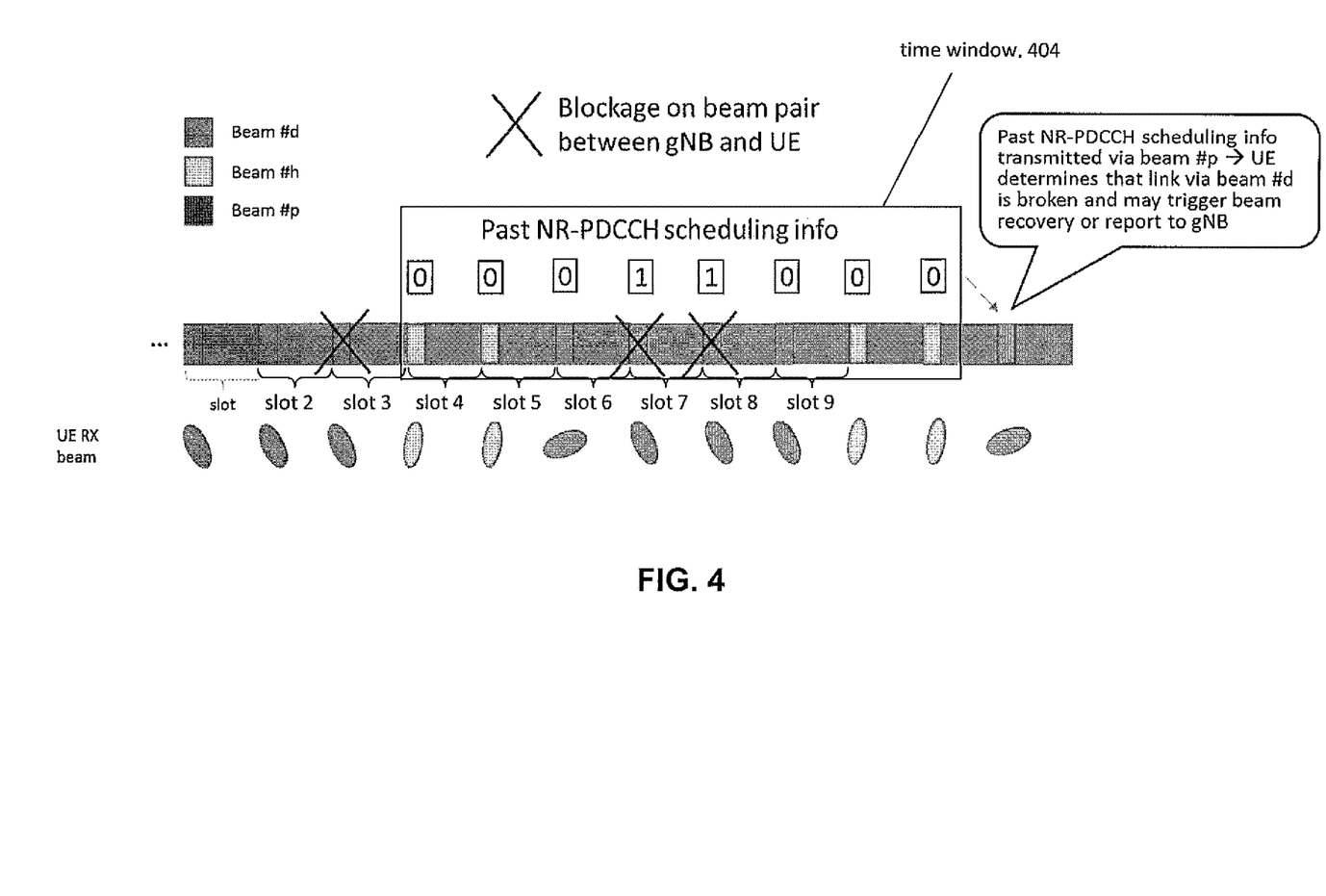
FIG. 4 is a similar to FIG. 3 with further detail showing signalling of past NR-PDCCH scheduling information to the UE which the UE may use to determine link blockage between any given transmit beam and its corresponding UE beam, according to an embodiment.

FIGS. 3-4 illustrate an example of how this signalling information can be used by a given UE to determine whether or not a given beam is blocked. Assumed the UE is configured for NR-PDCCH transmission from three gNB transmit beams shown in those drawings as beams #d, #h and #p. These beams may be transmitted from three different TRPs. The UE may have capability to form one RX beam at a time and thus the UE is configured with a time domain pattern that defines which one of the transmit beams may carry a given NR-PDCCH in any given slot. In FIG. 3 there is exactly one beam per slot and the time pattern is for beam #d in slots 1-3 and 7-9; beam #h in slots 4-5 and 10-11; and beam #p in slots 6 and 12.

As detailed above the gNB would, in its transmitted downlink control information (DCI) such as the DAI expanded to 3-bits, indicate to the UE the UE's past scheduling of NR-PDCCH transmission(s), and from this the UE would determine whether it has or has not missed any of them. Now further assume for this example that the window length for the past scheduled NR-PDCCH is 8 slots, and that the rule is that if the UE has missed at least two NR-PDCCH during the window the UE declares the beam pair be broken between the gNB and the UE. FIGS. 3-4 are a bit simplified to show the concept, but as mentioned above the UE is to blindly detect NR-PDCCHs within a detection window rather than in all slots continuously. In some embodiments the past scheduled NR-PDCCHs may not be consecutive in time, for example if they span two or more of the UE's blind detection windows. Also as mentioned above, the NR-PDCCH time unit may be in terms of slots or mini-slots or symbols, so the window length of 8 scheduled NR-PDCCH slots in the above example is not limiting for the number nor for the time unit being in terms of slots.

Different implementations may increment the count of past NR-PDCCHs differently. In one example every (dedicated or dedicated/common) NR-PDCCH that addresses the UE is included in the count, regardless of whether it triggers an uplink transmission from the UE (that is, allocate an uplink resource/PUSCH to the UE) or a downlink reception at the UE (that is, allocate a downlink resource/PDSCH to the UE). In this case it may be that a single NR-PDCCH (in a slot or in a mini-slot as the case may be) triggers both uplink transmission and downlink reception; such a NR-PDCCH would increment the counter by one. In another example, separate NR PDCCHs trigger uplink transmission and downlink reception; both NR-PDCCHs would increment the counter by one (for example, in the case both DL and UL grant exist in the same slot, the total increment for the counter would be two. In yet another example only those NR-PDCCHs that trigger a downlink reception at the UE are included in the count.

FIG. 4 continues with this example for the case in which the beam pair of transmit beam #d and its matching UE beam has experienced blockage in slots 3 and 7-8 as shown by the large X. The slot numbers are not labelled in FIG. 4 so as not to obscure other details but the slot numbering at FIG. 4 follows that of FIG. 3. Using the beam pattern described for FIG. 3, in FIG. 4 the gNB transmits a NR-PDCCH addressing this UE only in slots 7 (via beam #d), slot 8 (via beam #d) and slot 12 (via beam #p). But beam #d is blocked in slots 7-8 and so the UE does not receive those NR-PDCCHs but does not know there were NR-PDCCHs in those slots for it to receive. The next NR-PDCCH the UE receives is in slot 12 on beam #p. Like all the NR-PDCCHs in this example, it carries the signalling information that tells how many NR-PDCCHs the gNB sent to this UE in the sliding window immediately prior to this NR-PDCCH in slot 12. FIG. 4 shows the sliding time window 404 which is assumed for this example to run for 8 slots. In those 8 slots immediately preceding slot 12 the gNB sent exactly two NR-PDCCHs to this UE, which is the signalling information in the NR-PDCCH sent in slot 12 on beam #p. The UE knows it received neither of them, determines the blockage was on the link between the UE and beam #d, and in this example the rule is to perform a beam recovery/switching procedure if at least 2 (or some other predefined number of)

NR-PDCCHs were missed so the UE may choose to do so or instead send a beam status report to the gNB to indicate the current situation. In response to the beam recovery/switching procedure or the beam status report, the gNB may then re-configure for this UE the transmit beam set used for NR-PDCCH transmissions and the time domain monitoring pattern for them. As mentioned above, FIG. 4 assumes the sliding window 404 is over slots that are consecutive in time but that is a special case; in other examples the sliding window may span two or more of the UE's NR-PDCCH blind detection windows in order to capture 8 (or other number of) previous NR-PDCCH opportunities. Further, the predefined number of missed NR-PDCCHs can be set as low as 1 because, while a single PDCCH failure may be due to other causes apart from beam blocking (such as interference or link adaptation error), the probability of PDCCH failure due to something other than beam blocking should be less than 1%.

In different implementations the added information in the NR-PDCCH the UE receives in slot 12 of FIG. 4 is a bitmap, or a different counter for each configured transmit beam. For the 8-slot window length in the above example the bitmap could be 8 bits, so the UE can see exactly what slot or slots the NR-PDCCH(s) were missed and thus identify the broken beam. For the 3-configured TX beam example above the added information in the NR-PDCCH the UE receives in slot 12 of FIG. 4 would be at least two beam-specific counters; one for beam #d which in the FIG. 4 example would indicate a count of 2 and one for beam #h which in the FIG. 4 example would indicate a count of zero. A counter for beam #p would not be essential since this NR-PDCCH in slot 12 is on transmit beam #p already. The bitmap embodiment may be considered a count across all the transmit beams although it carries more information than only a count.

The signalling information about past NR-PDCCH scheduling for the specific but non-limiting example above could be implemented with a 3-bit codeword in the DCI, but in other deployments a further bit may be required for example if the window is longer. One implementation of this is use dedicated DAI-type information used for providing support for HARQ-ACK codebook size adaptation (HARQ-ACK transmitted via UL) in that codeword. As an alternative to the 2-4 bit codeword is to use a counter that is common over all the UE's preconfigured transmit beams, not unlike the DAI mentioned above that LTE utilizes for radio link failure purposes. This kind of signal could be part of Common DCI used to indicate for example slot type for the current and coming time slots.

In some deployments the UE may be configured with a dedicated resource that may be in the beam domain associated to the configured NR-PDCCH transmit beams; see for example document R1-1701011 mentioned in the background section (note that this is proposed for NR, not yet agreed). In this case one implementation would be that when the UE determines the blockage based on above mentioned signalling information the UE would transmit its uplink signal to initiate its beam recovery procedure or to initiate its beam status report on that dedicated resource. Such an initiating uplink signal may be for example a scheduling request signal to request resources for the UE to perform the beam recovery procedure or to send its beam status report. Another example of such an instantiating uplink signal is the UE's next transmission on the PRACH.

Further in regards to the UE being configured with a dedicated resource in the NR-PDCCH transmit beam domain, in a particular embodiment the UE shall assume the NR-PDCCH transmit beam for the coming downlink transmissions to be the one to which the used dedicated uplink resource is associated. Correspondingly the gNB would use the transmit beam to which the detected uplink signal (scheduling request) is associated for the subsequent NR-PDCCH transmissions to the UE, at least until the beam recovery and transmit beam re-configuration has been carried out. In this regard the beam re-configuration means the signalling between the gNB and the UE by which the new transmit beam configuration and the new time domain scheduling pattern, if any, is configured to the UE.

Because the above process is robust and relatively fast for discovering and identifying beam blockages, this may enable a longer duty cycle for the UE to provide its periodic beam status information (BSI) reports. This eventuality leads to further triggers for the beam recovery procedure. In this regard the periodic beam status information (BSI) reporting may take place in the low duty cycle to provide beam level measurements measured from low duty cycle beam reference signal beam sweeping procedure so as to "advertise" gNB downlink beams to the UE in a periodic manner. The BSI report is to be transmitted in the NR/5G system using either the uplink control channel (NR-PUCCH) or the uplink data channel (NR-PUSCH), and the contents of the report may indicate for example the UE's selected gNB transmit beams and the UE's measurement thereof such as reference signal received power (RSRP). But in this case the BSI report sent from the UE could inform on which beams the UE considers 'good' beams, and in this embodiment it could additionally indicate that the previously-used transmit beams and the UE's measurement of those in order to indicate to the gNB that the UE had blockage on those beams. So for this BSI reporting embodiment, if the UE determines there is a beam blockage based on the NR-PDCCH based signalling detailed above with respect to FIGS. 3-4, and if the UE further has a periodic BSI reporting resource within for example some predefined integer number M of slots from when the blockage was first determined, then this would trigger the UE to adapt its next BRI report to include the previously-used transmit beam measurement information.

There may also be prioritization rules for determining whether the UE reports the beam blockage in a BSI report or selects the beam recovery procedure. In the following example of such prioritization rules the UL RX beam is the RX beam from the gNB's perspective, and the DL TX beam is the TX beam from the gNB's perspective. In this example prioritization rule, if the UL RX beam for BSI reporting resource would be associated to the gNB TX beam that was determined to have been blocked the UE selects the beam recovery procedure based on the NR-PDCCH based functionality; this may be considered a first beam recovery procedure. In this case the UE shall assume the NR-PDCCH transmit beam for the coming downlink transmissions to be the one to which the used dedicated uplink resource is associated. But instead if the UL RX beam for BSI reporting resource would be associated to the gNB TX beam that has not been determined to be blocked the UE selects to transmit periodical BSI report where it may indicate the blockage has happened to a certain TX beam, and this may be considered a second beam recovery procedure. In this case, upon reception of the report the gNB can then reconfigure the UE with the new set of NR-PDCCH TX beams and the UE shall listen for NR-PDCCH from the non-blocked TX.

Figure 5:
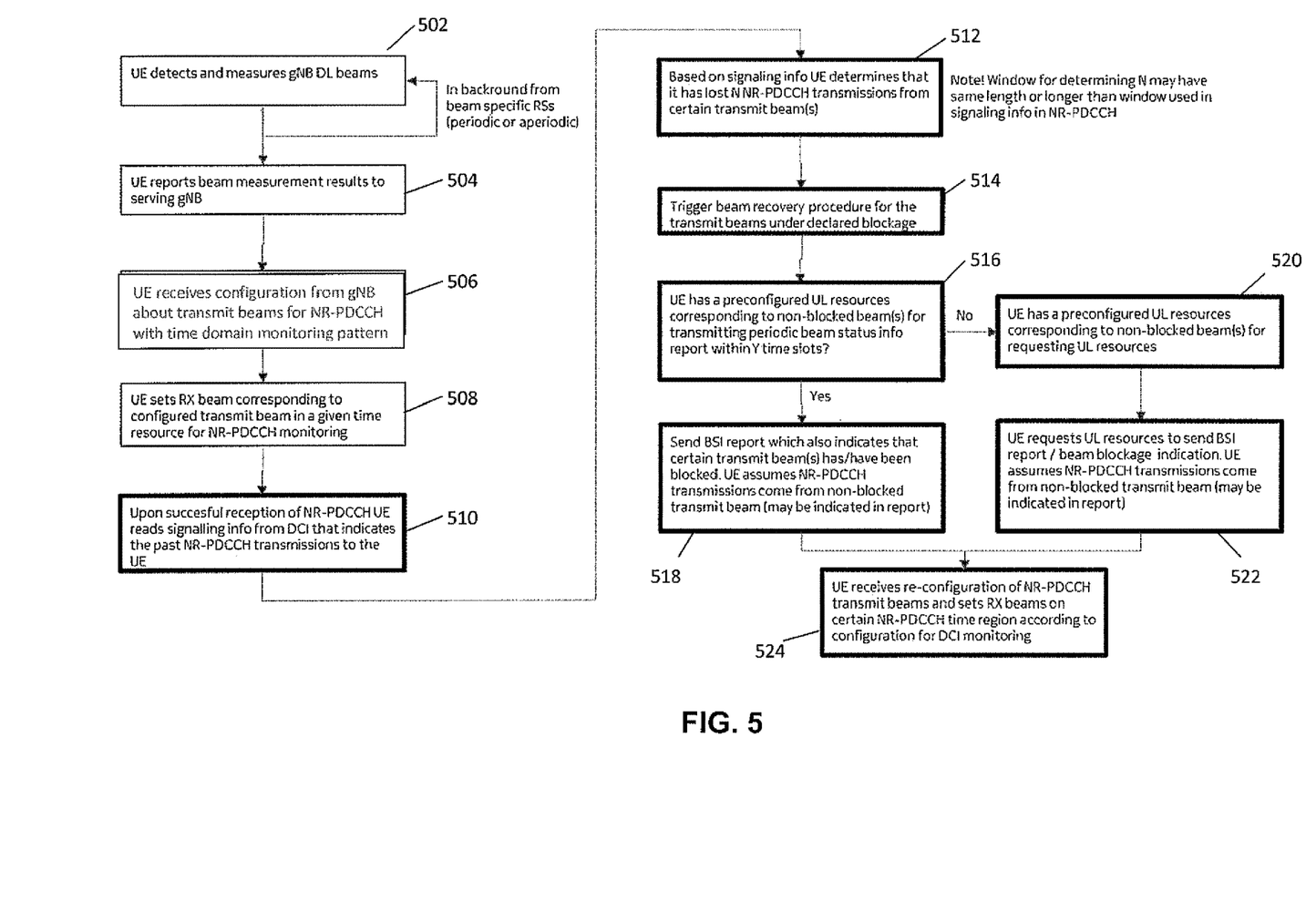
FIG. 5 is a process flow diagram of an embodiment from the perspective of the UE.

FIG. 5 is a process flow diagram of a particular embodiment of these teachings from the perspective of the UE. The boxes 502, 504, 506 and 508 provide a more complete context of the actions leading up to the UE being able to receive any NR-PDCCHs in the NR/5G system. At block 502 the UE detects and measures beam-specific reference signals on downlink beams from the gNB and at block 504 sends a beam measurement report of those measurements to the gNB. This is a continuing process, with periodic beam status reports (and possibly also beam status refinement reports) as configured by the network and aperiodic such reports as may be triggered by an event. With that information reported to the network, the UE receives a configuration from the gNB at block 506 that configures the UE with, among other beams, the transmit beams the UE is to monitor for any NR-PDCCHs that may allocate resources to the UE, and also a time pattern identifying which of those configured TX beams to monitor at any given instant.

Now assume the UE does receive such a NR-PDCCH that allocates resources to it on one or more of those configured TX beams. Block 510 has the UE receiving such a NR-PDCCH and reading from it the signalling information detailed further above that indicates the other (if any) NR-PDCCHs that were transmitted to the UE within the predefined time window. In the above examples this could be a simple count of such other NR-PDCCHs.

Using that signalling information/count the UE learned at block 510, at block 512 the UE determines in this example that it has not received some number N of those other NR-PDCCHs that were transmitted to it but which it did not receive. The number N is a positive integer at least equal to one. As noted alongside block 512, the 'window' back in which the UE looks to count up the number of missed NR-PDCCHs to see if it meets the minimum threshold of N may match the predefined time window underlying the count from block 510, or it may be shorter or longer. Exceeding that minimum threshold N of missed NR-PDCCHs then triggers the UE at block 514 to begin a beam recovery procedure for those transmit beam or beams that were blocked. In this regard for the remainder of the FIG. 5 example the UE initiates the beam recovery procedure by sending a beam status report to the gNB indicating the blocked beam or beams, which will itself trigger the gNB to provide the UE with a new beam configuration.

Block 516 has the UE checking whether it has a preconfigured uplink resource such as a PUCCH corresponding to any of the non-blocked beams for transmitting beam status information (BSI) within some predefined future period of Y time units (Y is a positive integer). In other examples the uplink resource can be a PRACH, or a medium access control (MAC) CE signalled on higher layers. If yes then the FIG. 5 flow proceeds to block 518 where the UE transmits the scheduled BSI report to include information such as measurement results on the beam or beams that were declared blocked at block 512. In this regard, since the UE has now informed the network of the blocked beam or beams, it will assume that until it gets a beam reconfiguration that the network will only send it NR-PDCCHs on the non-blocked beam or beams. This assumption may also be indicated in the BSI report as block 518 states. Eventually the UE receives from the gNB at block 524 a beam re-configuration of the transmit beams that it is to monitor for any NR-PDCCHs that address it. This re-configuration may or may not also include a new time pattern for monitoring those beams; if not the UE will simply re-use the old time pattern. The UE sets its receive beams according to that re-configuration and the governing time pattern for this monitoring. There are several techniques well known in the art for such matching of RX beams to TX beams such as symmetric beam pairing, so these techniques are not further detailed.

If instead the answer to the block 516 query is no then the FIG. 5 flow proceeds to block 520 where the UE chooses some preconfigured uplink resource corresponding to a non-blocked beam for requesting uplink resources, for example an uplink resource (PUCCH) on which the UE sends it buffer status report or a scheduling request, or the PRACH, or the PUSCH that was allocated by the NR-PDCCH at block 510 (if it did allocate a PUSCH). At block 522 the UE sends it request for uplink resources on the preconfigured uplink resource identified at block 520. This request may or may not identify that the purpose is to send a BSI or to otherwise report beam blockage. Similar to the discussion above for block 518, once the UE sends its BSI or otherwise reports the beam blockage at block 522 it will assume that assume that until it gets a beam re-configuration the network will only send it NR-PDCCHs on the non-blocked beam or beams. The UE receives that beam re-configuration at block 524 which is detailed further above.

Figure 6:
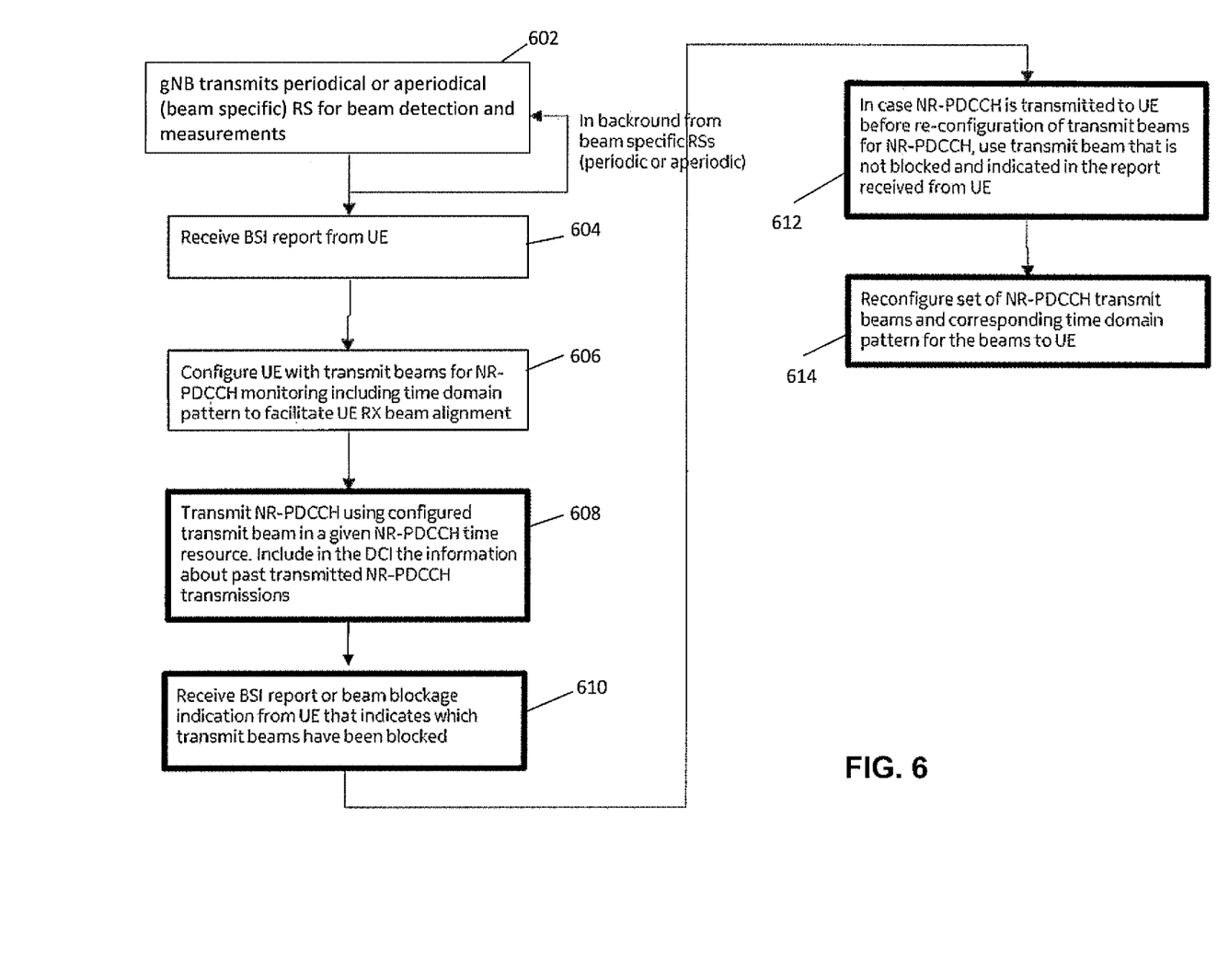
FIG. 6 is a process flow diagram of an embodiment from the perspective of the radio network/gNB.

FIG. 6 is a process flow diagram of a particular embodiment of these teachings from the perspective of the radio network, particularly the UE's serving gNB. The boxes 602, 604 and 606 provide a more complete context of the actions leading up to the gNB being able to transmit any NR-PDCCHs to this UE in the NR/5G system. At block 602 the gNB transmits beam-specific reference signals on downlink beams for detection and measurement by the UE, and at block 604 receives from that UE a beam measurement report. As mentioned for FIG. 5 this is a continuing process with periodic and/or aperiodic beam status reports being received from this UE. Knowing the information contained in the beam status report the network at block 606 configures the UE with, among other beams, the transmit beams the gNB will use to send to the UE any NR-PDCCHs that may allocate resources to that UE, and also a time pattern identifying which of those configured TX beams to monitor at any given instant.

Now assume the gNB transmits to the UE some one or more NR-PDCCHs between blocks 606 and 608, which the UE misses due to a blocked beam or beams. The gNB is not yet aware those NR-PDCCHs have been missed when it transmits at block 608 another NR-PDCCH to the UE using the configured transmit beam in the given time unit (slot/symbol) according to the time pattern. Within this NR-PDCCH (as well as the previous ones) there is signalling information detailed further above that indicates the earlier (between blocks 606 and 608) NR-PDCCHs that the gNB transmitted to this UE within the predefined time window. In the above examples this indicated a simple count of such earlier NR-PDCCHs.

The network/gNB first becomes aware there is a beam blockage issue when it receives the BSI from the UE at block 610. This is the same BSI the UE sent according to either block 518 or block 522 of FIG. 5, and so it indicates which beam or beam is blocked. Until a new beam configuration is sent to this UE at block 614 (which may include a new time pattern for the re-configured beams), the beam configuration provided at block 606 remains active but the network is now aware from the BSI at block 610 that one or more of the configured transmit beams are blocked, so block 612 tells that during this interim period if the gNB has any further NR-PDCCHs to send to the UE it will do so using one or more of the configured transmit beams that are not blocked.

FIGS. 5-6 are each process flow diagrams that each also represents a method and additionally represents steps or portions of computer program executable code that may be used to implement these teachings when embodied on some tangible computer readable memory or memories, and additionally represents actions taken by a host device such as a UE or gNB when one or more processors executes such stored computer executable code.

Embodiments of these teachings provide certain technical effects, including fast link recovery and robustness in beam based systems that are sensitive to beam blockages (particularly sudden beam blockages). Further, the UE initiating the beam recovery (for example based on reading out the counter/DAI in the above examples) is seen to introduce less latency in beam recovery as compared to waiting for the gNB to identify a beam blockage situation, at least if the gNB did so from the existing HARQ-ACK signaling because the gNB cannot typically differentiate DTX from NACK.

Figure 7:
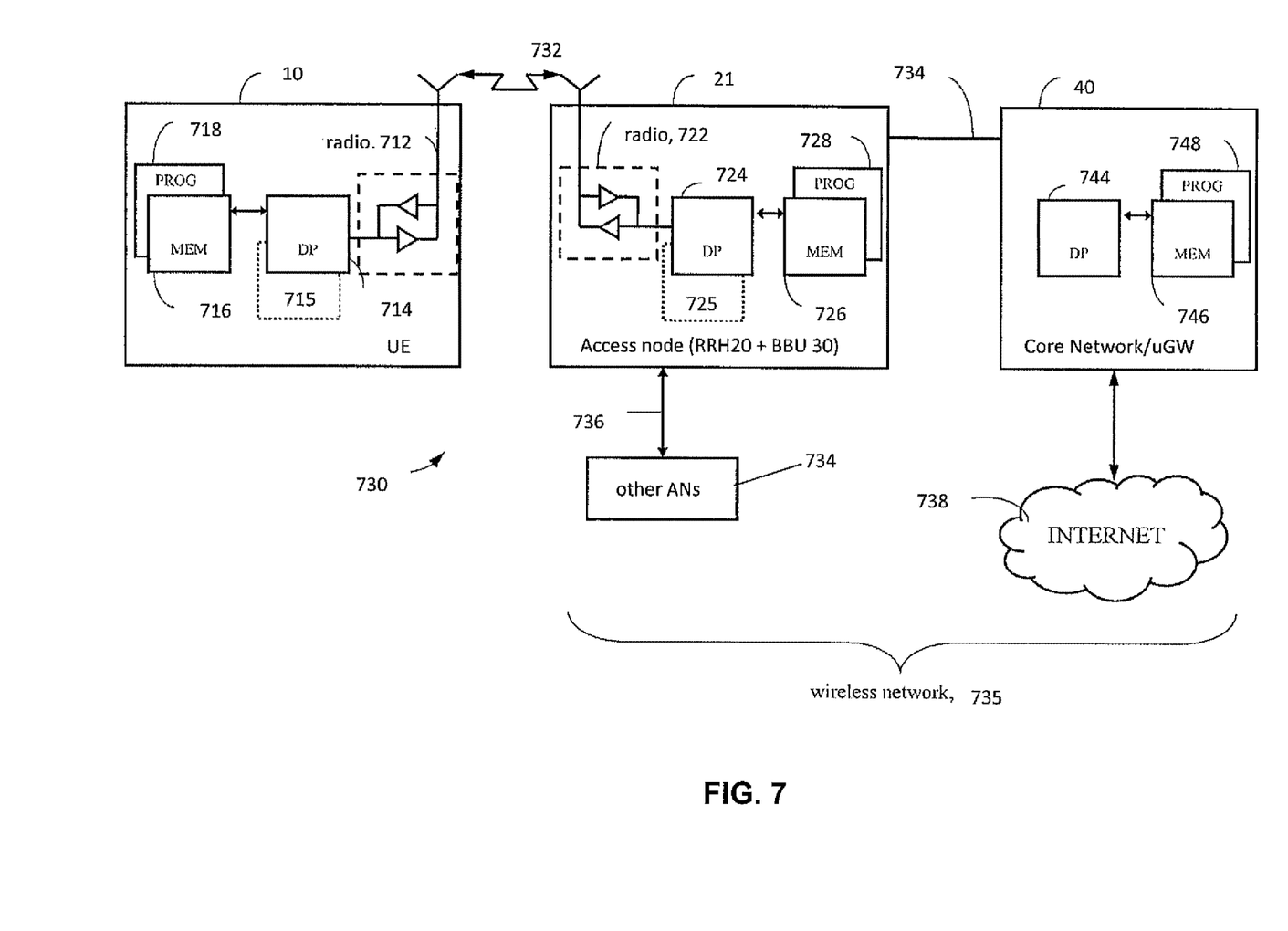
FIG. 7 is a diagram illustrating some components of certain entities of a radio network and components of a UE/mobile device, suitable for practicing various aspects of the invention.

FIG. 7 is a high level diagram illustrating some relevant components of various communication entities that may implement various portions of these teachings, including a base station identified generally as a radio network access node 21 (shown at FIG. 1 as the RRH 20 plus the BBU 30), a core network which may also be co-located with a user-plane gateway (uGW) 40, and a user equipment (UE) 10. In the wireless system 730 of FIG. 7 a communications network 735 is adapted for communication over a wireless link 732 with an apparatus, such as a mobile communication device which may be referred to as a UE 10, via a radio network access node 21. The core network 735 may include a Serving- or User-GW 40 that provides connectivity with other and/or broader networks such as a publicly switched telephone network and/or a data communications network (e.g., the internet 738).

The UE 10 includes a controller, such as a computer or a data processor (DP) 714 (or multiple ones of them), a computer-readable memory medium embodied as a memory (MEM) 716 (or more generally a non-transitory program storage device) that stores a program of computer instructions (PROG) 718, and a suitable wireless interface, such as radio frequency (RF) transceiver or more generically a radio 712, for bidirectional wireless communications with the radio network access node 21 via one or more antennas. In general terms the UE 10 can be considered a machine that reads the MEM/non-transitory program storage device and that executes the computer program code or executable program of instructions stored thereon. While each entity of FIG. 7 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 21 also includes a controller, such as a computer or a data processor (DP) 724 (or multiple ones of them), a computer-readable memory medium embodied as a memory (MEM) 726 that stores a program of computer instructions (PROG) 728, and a suitable wireless interface, such as a RF transceiver or radio 722, for communication with the UE 10 via one or more antennas. The radio network access node 21 is coupled via a data/control path 734 to the core network 40. In certain 5G deployments prior to the point 5G can stand alone it may be that the gNB 21 is coupled to an eNB of a LTE system according to a NR-LTE interworking arrangement, in which case the core network is likely to be the eNB's. However deployed, the radio network access node 21 may also be coupled to other radio network access nodes (ANs) 734 via data/control path 736.

The core network 40 includes a controller, such as a computer or a data processor (DP) 744 (or multiple ones of them), a computer-readable memory medium embodied as a memory (MEM) 746 that stores a program of computer instructions (PROG) 748.

At least one of the PROGs 718, 728 is assumed to include program instructions that, when executed by the associated one or more DPs, enable the device to operate in accordance with exemplary embodiments of this invention. That is, various exemplary embodiments of this invention may be implemented at least in part by computer software executable by the DP 714 of the UE 10; and/or by the DP 724 of the radio network access node 21; and/or by hardware, or by a combination of software and hardware (and firmware).

For the purposes of describing various exemplary embodiments in accordance with this invention the UE 10 and the radio network access node 21 may also include dedicated processors 715 and 725 respectively.

The computer readable MEMs 716, 726 and 746 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 714, 724 and 744 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 712 and 722) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes.

Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:
3GPP Third Generation Partnership Project
BBU baseband unit
BS base station
BSI beam status information
DCI downlink control information
DTX discontinuous transmission
E-UTRAN evolved UMTS radio access network
gNB base station of a 5G system
LTE long term evolution (of E-UTRAN; also referred to as 4G)
m-MIMO Massive Multiple-Input Multiple Output
NR new radio (also referred to as 5G)
PBCH physical broadcast channel
PDCCH physical downlink control channel
PRACH physical random access channel
PUCCH physical uplink control channel
PUSCH physical uplink shared channel
RRH remote radio head
RS reference signal
RX receive
TRP transmission-reception point
TX transmit
UE user equipment
UMTS universal mobile telecommunications service

What is claimed is:

1. An apparatus comprising at least one processor and at least one memory tangibly storing a computer program; wherein the at least one processor is configured with the at least one memory and the computer program to cause the apparatus to:
    receive signaling to configure a user equipment with multiple transmit beams each for receiving beam-specific downlink control information;
    receive a beam-specific current downlink control information at the user equipment on at least one of the transmit beams, said received current downlink control information including information about beam-specific previous downlink control information transmitted to the user equipment on any of the multiple transmit beams within a predefined time window preceding a time unit in which the current downlink control information was received;
    use the information about the beam-specific previous downlink control information to determine that at least one of the multiple transmit beams has been blocked;
    determine from the information that reception by the user equipment of at least a predefined minimum number of the previous downlink control information transmitted to the user equipment on any given one of the multiple transmit beams within the predefined time window has failed; and
    report each of the multiple transmit beams that have been determined to be blocked.

2. The apparatus according to claim 1, wherein the at least one processor is configured with the at least one memory and the computer program to cause the apparatus to:
    send a beam status information report that identifies each of the multiple transmit beams that have been determined to be blocked.

3. The apparatus according to claim 1, wherein the at least one processor is configured with the at least one memory and the computer program to cause the apparatus to:
    send a beam status information report on a preconfigured uplink resource that corresponds to one of the non-blocked multiple transmit beams and is for reporting beam status information only in response to said preconfigured resource being within a predefined maximum number of time units from said determining that at least one of the multiple transmit beams has been blocked;
    send a beam status information report on an uplink resource obtained by the user equipment in response to an uplink resource request sent by the user equipment after the at least one of the multiple transmit beams was determined to have been blocked.

4. The apparatus according to claim 1, wherein the at least one processor is configured with the at least one memory and the computer program to cause the apparatus report in part of a beam recovery procedure in which the user equipment receives a beam re-configuration.

5. The apparatus according to claim 4, wherein the at least one processor is configured with the at least one memory and the computer program to cause the apparatus to:
    between the reporting and the user equipment receiving the beam reconfiguration, monitor for beam-specific further downlink control information on the multiple transmit beam or beams which were not determined to have been blocked.

6. The apparatus according to claim 5, wherein the at least one processor is configured with the at least one memory and the computer program to cause the apparatus to select the beam recovery procedure from among at least a first and a second beam recovery procedure according to predetermined prioritization rules in response to the user equipment having a preconfigured uplink resource allocated for a periodic beam status report within a predefined maximum number of time units from said determining.

7. The apparatus according to claim 6, wherein the pre-determined prioritization rules comprise:
select the first beam recovery procedure in response to an uplink beam corresponding to the preconfigured uplink resource being associated to one of the multiple transmit beams that have been determined to be blocked;
select the second beam recovery procedure in response to an uplink beam corresponding to the preconfigured uplink resource being associated to any of the multiple transmit beams that have not been determined to be blocked.

8. The apparatus according to claim 1, wherein:
the multiple transmit beams are associated to at least two different transmit-receive points; and wherein the at least one processor is configured with the at least one memory and the computer program to cause the apparatus to
receive signal reference power from each of the transmit-receive points and to use with the information about the beam-specific previous downlink control information to determine that at least one of the multiple transmit beams has been blocked.

9. The apparatus according to claim 1, wherein the information about the beam-specific previous downlink control information indicates a count of such downlink control information over the multiple transmit beams, or a beam-specific count for at least some of the multiple transmit beams.

10. The apparatus according to claim 9, wherein the at least one processor is configured with the at least one memory and the computer program to cause the apparatus to receive each of the beam-specific downlink control information on a physical downlink control channel, and the count is at least one of: previous physical downlink control channels that allocate a downlink resource to the user equipment, and previous physical downlink control channels that allocate to the user equipment a downlink resource and/or an uplink resource.

11. The apparatus according to claim 1, wherein the at least one processor is configured with the at least one memory and the computer program to cause the apparatus to trigger the reporting using at least one of a physical random access channel and a physical uplink control channel.

12. The apparatus according to claim 1, wherein the information about the beam-specific previous downlink control information transmitted to the user equipment is received in the beam-specific current downlink control information which comprises at least one of:
a downlink control information specific to the user equipment; and
a downlink control information common to multiple user equipment.

13. The apparatus according to claim 1, wherein said received current downlink control information including information about all beam-specific previous downlink control information transmitted to the user equipment on any of the multiple transmit beams within a predefined time window preceding a time unit in which the current downlink control information was received.

14. The apparatus according to claim 1, wherein the at least one processor is configured with the at least one memory and the computer program to cause the apparatus, in response to determining the reception by the user equipment of at least the predefined minimum number of the previous downlink control information transmitted to the user equipment on any given one of the multiple transmit beams within the predefined time window has failed, to trigger by the user equipment a beam recovery procedure for those given one or ones of the multiple transmit beams upon which the reception has failed.

15. A method comprising:
receiving signaling to configure a user equipment with multiple transmit beams each for receiving beam-specific downlink control information;
receiving a beam-specific current downlink control information at the user equipment on at least one of the transmit beams, said received current downlink control information including information about beam-specific previous downlink control information transmitted to the user equipment on any of the multiple transmit beams within a predefined time window preceding a time unit in which the current downlink control information was received;
using the information about the beam-specific previous downlink control information to determine that at least one of the multiple transmit beams has been blocked;
determine from the information that reception by the user equipment of at least a predefined minimum number of the previous downlink control information transmitted to the user equipment on any given one of the multiple transmit beams within the predefined time window has failed; and
reporting each of the multiple transmit beams that have been determined to be blocked.

16. The method according to claim 15, further comprising, in response to determining the reception by the user equipment of at least the predefined minimum number of the previous downlink control information transmitted to the user equipment on any given one of the multiple transmit beams within the predefined time window has failed, triggering by the user equipment a beam recovery procedure for those given one or ones of the multiple transmit beams upon which the reception has failed.

17. An apparatus comprising at least one processor and at least one memory tangibly storing a computer program; wherein the at least one processor is configured with the at least one memory and the computer program to cause the apparatus to:
configure a user equipment with multiple transmit beams each for receiving beam-specific downlink control information;
transmit to the user equipment a beam-specific current downlink control information on at least one of the transmit beams, said transmitted current downlink control information including information about beam-specific previous downlink control information transmitted to the user equipment on any of the multiple transmit beams within a predefined time window preceding a time unit in which the current downlink control information was received;
in response to receiving from the user equipment a report indicating at least one multiple transmit beam has been determined to be blocked, reconfigure the user equipment with a different set of multiple transmit beams each for beam-specific downlink control information; and
between receiving the report and re-configuring the user equipment, restrict transmission of beam-specific further downlink control information for the user equipment to the multiple transmit beam or beams which the report does not indicate have been determined to be blocked.

18. The apparatus according to claim 17, wherein the at least one processor is configured with the at least one memory and the computer program to cause the apparatus to receive the report from the user equipment on one of:
 a preconfigured uplink resource that corresponds to one of the non-blocked multiple transmit beams; and
 an uplink resource obtained by the user equipment in response to an uplink resource request received from the user equipment after the report has been received.

19. The apparatus according to claim 17, wherein the information about the beam-specific previous downlink control information indicates a count of such downlink control information over the multiple transmit beams, or a beam-specific count for at least some of the multiple transmit beams.

20. The apparatus according to claim 17, wherein the information about the beam-specific previous downlink control information transmitted to the user equipment is transmitted in the beam-specific current downlink control information which comprises at least one of:
 a downlink control information specific to the user equipment; and
 a downlink control information common to multiple user equipment.

* * * * *